United States Patent [19]

Hamilton

[11] 4,004,622
[45] Jan. 25, 1977

[54] HARVESTER PROCESSOR ASSEMBLY

[75] Inventor: Douglas D. Hamilton, Mount Royal, Canada

[73] Assignee: Logging Development Corporation, Montreal, Canada

[22] Filed: Dec. 30, 1974

[21] Appl. No.: 537,459

[30] Foreign Application Priority Data

Jan. 7, 1974   Canada .............................. 189608

[52] U.S. Cl. .............................. 144/3 D; 144/2 Z; 144/34 E; 144/309 AC
[51] Int. Cl.² .......................................... A01G 23/08
[58] Field of Search ................. 144/2 Z, 3 D, 34 R, 144/34 E, 309 AC

[56] References Cited
UNITED STATES PATENTS

| | | | |
|---|---|---|---|
| 3,540,501 | 11/1970 | Jonsson ............................. | 144/34 E |
| 3,669,161 | 6/1972 | Gutman et al. ..................... | 144/3 D |
| 3,797,539 | 3/1974 | Moser et al. ....................... | 144/3 D |

Primary Examiner—Leonidas Vlachos
Assistant Examiner—W. D. Bray
Attorney, Agent, or Firm—Shanley, O'Neil and Baker

[57] ABSTRACT

An apparatus for mounting on the free end of an extendible and retractable boom for handling trees comprising a first rigid frame assembly, a second frame assembly mounted on said first frame assembly at one end thereof and having a pair of arms pivotally mounted thereon, and a third frame assembly mounted on the opposite end and having a pair of arms pivotally mounted thereon. A further pair of arms are pivotally mounted on the third frame assembly and have cutting members for severing a tree. The apparatus provides a felling head having a pair of grapples spaced apart from one another longitudinally along a tree grasped thereby and a device for severing the grasped tree. Tree feed means is mounted on the first frame assembly for propelling a tree endwise between the arms of the second and third assemblies embracing such tree. The arms pivotally mounted on the second frame assembly have cutting edges for removing limbs from the tree as it is propelled endwise.

9 Claims, 8 Drawing Figures

HARVESTER PROCESSOR ASSEMBLY

This invention relates to a processing assembly for a tree harvester, a tree harvester incorporating the same, and to a portion of the processing assembly which provides an improved felling head for felling trees.

Tree harvesters are well known which include a tree processing assembly on the free end of an extendible and retractable boom carried by a mobile vehicle. The processing assembly in such machines includes a grapple for grasping the trunk of a tree and a severing device for cutting the tree from its roots. The grapple and severing device can be controllably tilted to fell the standing tree whereafter processing operations are performed on the tree. The processing assembly may include a delimber for removing the limbs from the tree and means for propelling the tree through the processing assembly. A tree harvester of this general type is disclosed, for example, in Hamilton et al U.S. Pat. No. 3,732,904 issued May 15, 1973 and Gibson U.S. Pat. No. 3,542,099 issued Nov. 24, 1970. A further type of tree harvester is disclosed in Canadian Patent 927,717 issued June 5, 1973 to Owen-Illinois Inc.

Known felling heads and also processing assemblies of the foregoing type are relatively complicated consisting of many parts. Accordingly they are difficult to manufacture and also are extremely heavy. When mounting the processing head on the free end of an extendible and retractable boom it should be as light as possible avoiding instability of the vehicle during handling of the trees.

A principal object of the present invention is to provide an improved and simplified felling head, an improved and simplified processing assembly for a tree harvester and a tree harvester incorporating the same.

A further principal object of the present invention is to provide a processing assembly consisting of subcomponents which can be readily assembled into a finished product.

Accordingly there is provided in accordance with the present invention in tree harvester: (a) an elongated frame adapted to be moved to a position extending vertically along a trunk of a standing tree; (b) limb-shearing means mounted on the upper end of the frame; (c) driven endless conveying means mounted on the frame below the limb shearing means and having formations thereon projecting therefrom for tractively engaging the trunk of the tree to propel the same endwise past the limb shearing means; and (d) a tree severing means mounted on the lower end of the frame below the endless conveying means and comprising a pair of arms pivotally mounted on the frame adjacent the lower end thereof and inclined downwardly and forwardly therefrom terminating in free outer end portions, a pair of shear blades secured to respective ones of said outer free end portions for severing the trunk of the tree embraced by said limb shear means, and hydraulic power cylinder means connected to said arms for moving the same to sever the trunk of the tree.

In accordance with a further aspect of the present invention there is provided a felling head adapted to be mounted on the free end of an extendible and retractable boom for felling standing trees comprising: (a) a rigid frame having an upper and lower plate member; and (b) four arms pivotally mounted on said frame between said upper and lower plates and extending therefrom, two of said arms being curved providing a grapple for grasping the trunk of a tree and the other two arms being inclined relative to said grapple arms and having shear blades secured thereto adjacent the free ends thereof for severing the trunk of a tree grasped by the grapple at a position spaced therefrom and from said frame.

The invention is illustrated by way of example with reference to the accompanying drawings wherein.

Figure 1:
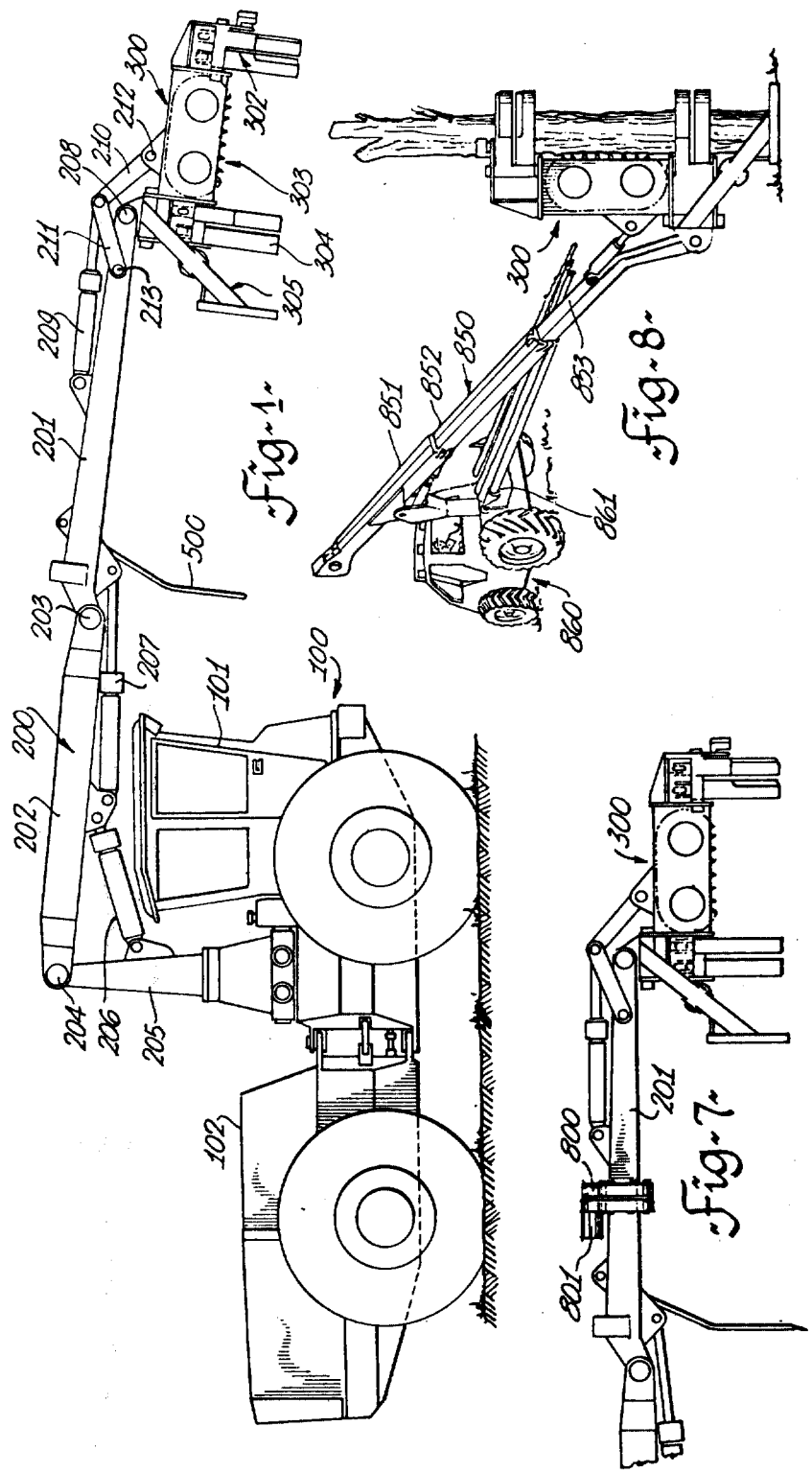
FIG. 1 is a side elevational view of a tree harvester provided in accordance with the present invention.

FIG. 7, appearing on the same sheet of drawings as FIG. 1, is a partial side elevational view illustrating a modification to the boom; and FIG. 8, appearing on the same sheet of drawings as FIG. 1, depicts a modified harvester in accordance with the present invention.

Referring now in detail to the drawings, there is illustrated a tree harvester consisting of a self-propelled mobile vehicle 100 having an extendible and retractable boom 200 mounted thereon and which carries a processing assembly 300 on the free and thereof.

The mobile vehicle 100 is an articulated type vehicle having an operator's cab 101 mounted on one chassis thereof and a tree collector 102 mounted on the other chassis. The collector may be a cradle type as, for example, disclosed in Bruce McColl's Canadian Pat. No. 659,445 issued Mar. 12, 1963.

The extendible and retractable boom 200 is a knuckle boom having a pair of boom elements 201 and 202 hingedly interconnected by a pin 203. The boom element 202 is hingedly connected by a pin 204 to a post 205 mounted on the vehicle 100 for slewing about a vertical axis. Slewing of the post 205 may be effected by any conventional means known in the art. The boom element 202 is controllably raised and lowered by a hydraulic power cylinder 206 and the boom element 201 is moved about the pivot pin 203 by a hydraulic power cylinder 207.

The processing assembly 300 is pivotally attached to the free end of boom element 201 by a pivot pin 208. The processing assembly is pivotally moved about the pin 208 by hydraulic power cylinder 209 through a pair of hingedly connected links 210 and 211. Link 210 is hingedly connected to the processing assembly 300 by a pivot pin 212 and the link 211 is hingedly connected to the boom element 201 by a pivot pin 213.

The processing assembly 300 is shown in detail in FIG. 2 to 5 inclusive and consists essentially of a rigid frame having mounted thereon a combination first grapple and stripper delimber 302, a tree propelling means 303, a second grapple 304 and at tree severing shear 305.

The rigid frame has a central U-shaped channel section 306 closed respectively at opposite ends by cap members designated generally by reference numerals 307 and 308. The channel-shaped center section 306 has a rear wall or web 309 and a pair of spaced apart flanges 310 and 311.

Figure 2:
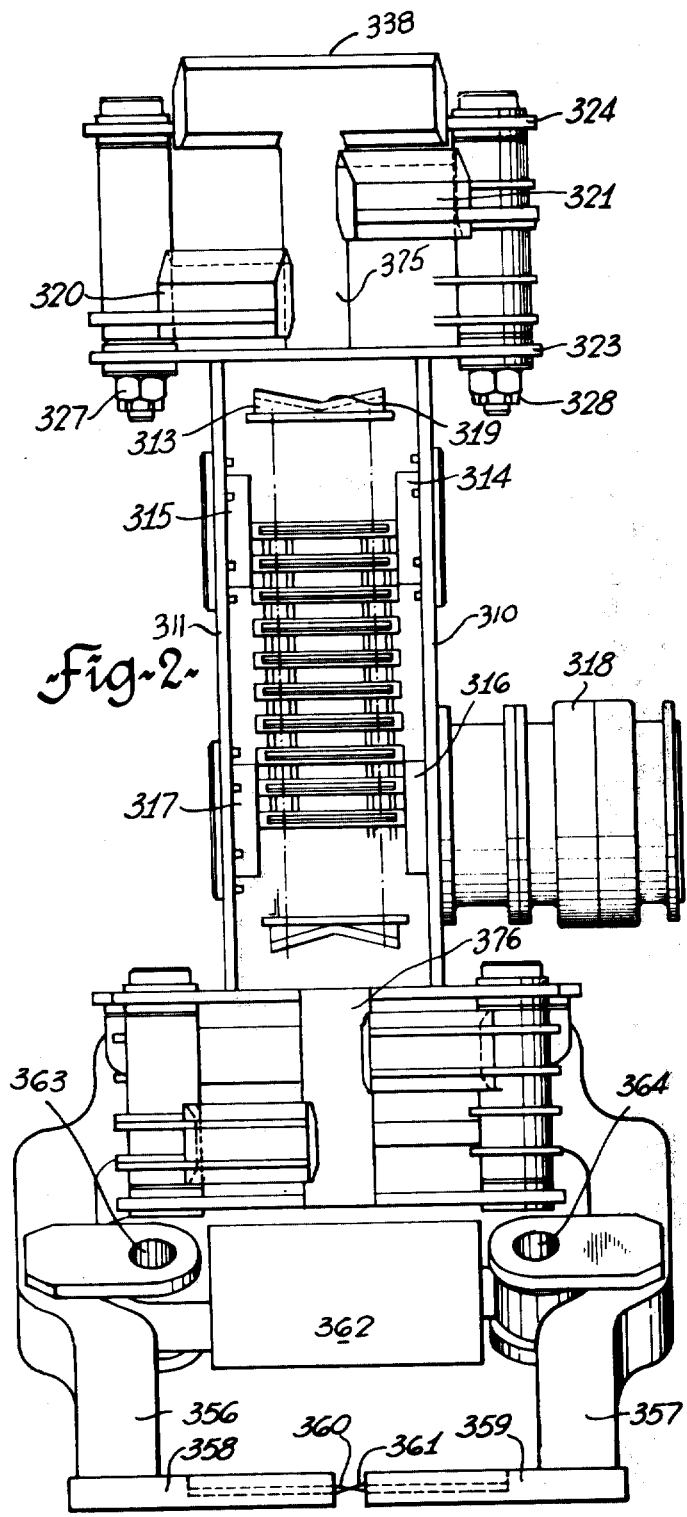
FIG. 2 is a front elevational view of the processing assembly shown in FIG. 1 and tilted to a vertical position.

The tree propelling means 303 is mounted within the U-shaped channel 306 and consists of an endless belt-type member 312 extending longitudinally within the channel and having a plurality of cleats 313 or spikes on the outer surface thereof. The endless belt 312 passes around an idler or sprocket assembly mounted by journals 314 and 315 in respective flanges 310 and 311 of the channel frame. The other end of the belt passes around a sprocket assembly journalled by bearings 316 and 317 mounted on the respective flanges 310 and 311 and driven by a hydraulic motor 318. The cleats 313, as seen in FIG. 2, have an outer V-shaped sharpened edge 319 which projects slightly beyond the flanges 310 and 311 as seen from FIG. 3 for engaging, along one length of the belt, a tree to be propelled in a manner as will be described hereinafter. The journals 314 and 315 may be adjustably mounted on the flanges 310 and 311 for adjusting tension in the belt 312 in any conventional manner.

The assembly 307 consists of a weldment of plates providing effectively a box-like unit on which are mounted stripping delimber members 320, 321 and 322. The box-like member has a first plate 323 secured as by welding or the like to the U-shaped channel member 306 and a second plate member 324 spaced therefrom. The plates 323 and 324 project laterally beyond the flanges 310 and 311, as is clearly seen in FIG. 2, and are interconnected by further plates such as 325 rigidly secured thereto and reinforced as, for example, by gusset members 326. The plates 324 and 325 have aligned apertures respectively on opposite sides of the U-shape channel 306 for receiving pivot pins 327 and 328 pivotally mounting respective delimber arms 320 and 321. Each of the stripper delimber arms 320 and 321 have an arcuate cutting edge, as viewed in plan in FIG. 5, for removing limbs from a tree while the tree is propelled endwise between the arms. The arms 320 and 321 are movable toward and away from one another by a hydraulic cylinder 329 pivotally attached at one end by pivot pin 330 to the frame 307. The piston rod portion of the hydraulic cylinder 329 is pivotally connected by a pin 331 to a lug 332 secured to the arm 321 and projecting beyond the arm mounting pivot pin 328. Movement of the arms 320 and 321 is synchronized by a link 333 interconnecting the same. The link 333 is pivotally connected at one end by a pivot pin 334 to a lug 335 secured to the arm 321 and, at the other end, by a pviot pin 336 in a lug 337 secured to the arm 320. The delimber arm 322 is rigidly secured to the plate 324 of member 307 and has an arcuate cutting edge 338 facing in the same direction as the arcuate cutting edges of arms 320 and 321. A stripper delimber of this general type is disclosed in U.S. Pat. No. 3,443,611 issued May 13, 1969 to Karl-Gunnar Jourgensen.

Figure 3:
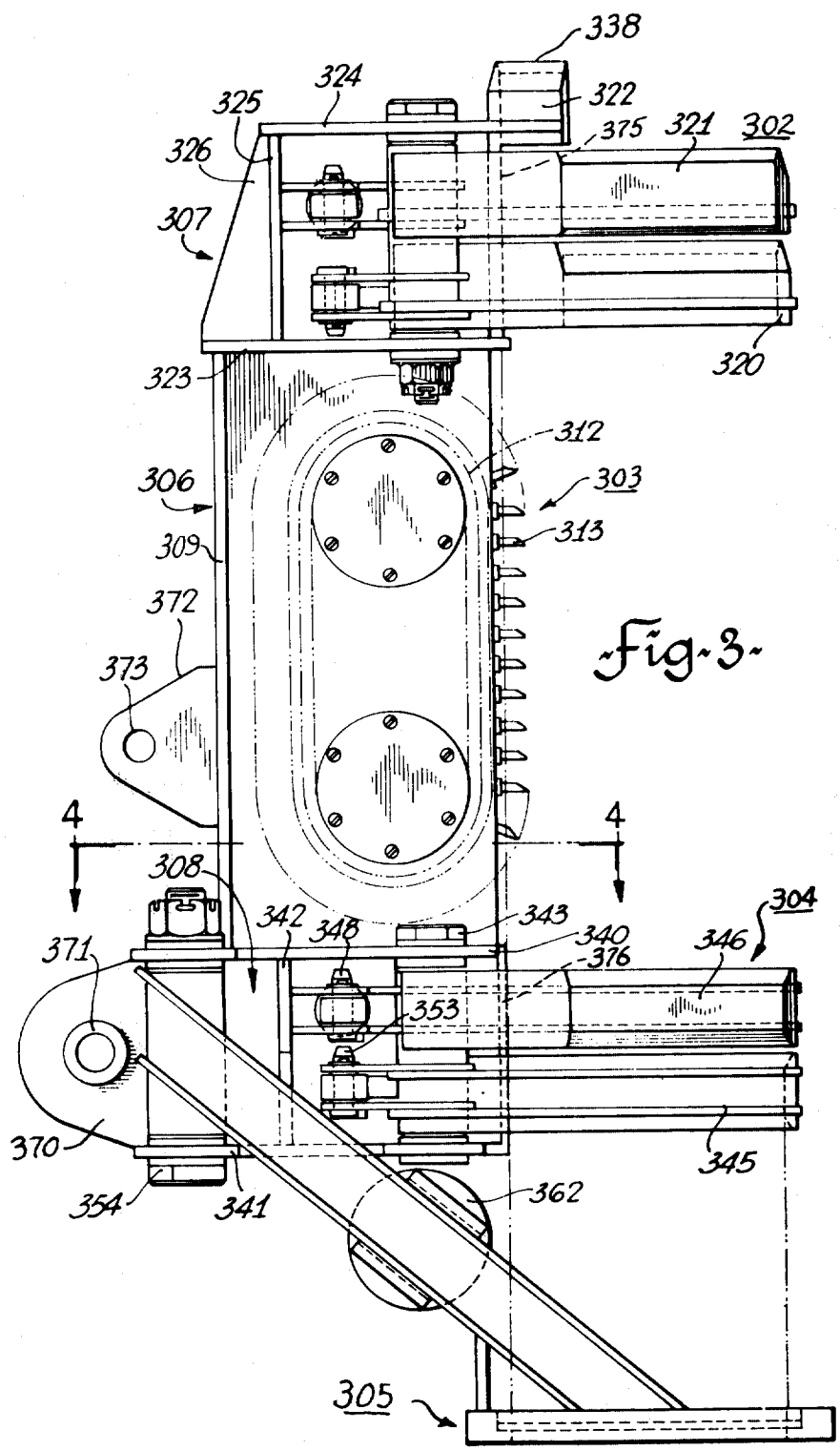
FIG. 3 is a side elevational view of the processing assembly illustrated in FIG. 2.

From the foregoing it can be seen the unit 307 provides the tree processing assembly designated 302 in FIG. 1. In FIG. 3 the assembly 307 is illustrated rigidly attached to the channel member 306. If desired, however, the assembly 307 may be constructed such as to be detachably securable to the channel 306 facilitating replacement of the processing assembly should failure occur during use in the field. The assembly 307 may readily be detachably mounted by bolting plate 323 to a further similar plate which is rigidly secured, as by welding or the like, to the end of the channel member 306. It will also be evident to those skilled in the art cutting members 320, 321 and 322 may be replaced by a pair of grapple arms pivotally mounted on the frame by respective pins 327 and 328 thereby providing only a grapple for grasping a tree.

The assembly 308 mounted at the opposite end of the U-shaped channel 306 provides a mounting for the grapple 304 and tree cutting device 305. The assembly 308 is a box-like member consisting of a first plate 340 rigidly secured, as by welding or the like, to the U-shaped channel 306 and a second plate 341 spaced therefrom and interconnected thereto by a series of further plates as, for example, 342. The plates 340 and 341 have a first pair of aligned apertures respectively on opposite sides of the member 306 for receiving respective pivot pins 343 and 344 pivotally mounting respective ones of a pair of grapple arms 345 and 346. The grapple arm 346 is pivoted about the pin 344 by a hydraulic power cylinder 347 pivotally connected at the cylinder end by a pin 348 to a lug secured to the flange 342 and at the rod end by a pin 349 to a lug secured to the arm 346. The arm 345 is moved by a synchronizing link 350 pivotally connected respectively at opposite ends by pivot pins 352 and 353 to lugs projecting from the respective arms 346 and 345.

The plates 340 and 341 are provided with a second pair of aligned apertures located on opposite sides of the channel member 306 for receiving respective pivot pins 354 and 355. The pins 354 and 355 are located behind pivot pins 343 and 344 and have respective ones of a pair of arms 356 and 357 mounted thereon. The arms are inclined downwardly and forwardly (see FIG. 3) and have respective shear blade mounting plate 358 and 359 secured thereto and to which are attached respective cutting blades 360 and 361. The blades are flat planar plates and are so disposed as to sever the stem of a tree transverse to its length when grasped by grapples 302 and 304. The arms 356 and 357 are interconnected by a hydraulic power cylinder 362 for moving the shear blades toward and away from one another respectively to sever and receive a tree therebetween and by virtue of the arms being inclined, the power cylinder 362 is located below the frame assembly 308 (see FIG. 3). The cylinder portion of the hydraulic cylinder 362 is connected by a pivot pin 363 to the arm 356 and the piston portion is pivotally connected to the arm 357 by a pivot pin 364. The pivot 354 and/or pivot 355 is provided with a stop limiting the open position of the arm. Alternatively, stops may be provided and which are secured to the assembly 308 for engaging the respective arms 356 and 357 to limit the open position of the same.

Secured to the frame 308 are a pair of lugs 370 having aligned apertures 371 therein to receive pivot mounting pin 208. Similarly, a pair of lugs 372 are secured to the web 309 of channel 306 and have aligned apertures 373 for receiving pivot pin 212.

As will be evident from the foregoing and clearly seen in FIGS. 2 and 3, each of the processing assembly 302, i.e. combination grapple and stripper delimber, grapple 304 and tree severing shear 305 have a pair of jaw members movable away from and toward a common plane respectively to receive and engage a tree therebetween. The processing assembly 302, which is a stripper delimber, and the grapple 304 and the shear 305 are located at positions spaced longitudinally along the tree. The grapple 304 and shear 305 have arms pivotally mounted on the frame 308 by pivot pins spaced substantially equal distances from the delimber and thus permits using a relatively short frame compared to prior known devices and thus minimizing weight. The separate pivot pins for the grapple arms 345 and 346 and shear arms 356 and 357 permits easy removal of the latter for replacement or use of the remaining assembly as a grapple. In the latter instance the tree propelling means 303 may be omitted from the channel member 306. It will also be readily apparent grapple 304 and shear 305 may be used independent of the remaining structure to provide a simple, relatively light felling head.

The frame 308, as previously described with respect to frame 307, may be detachably mounted on the channel 306 permitting removal of the same for replacement in the event of failure during use in field logging operations. Such detachable connection may be provided by having a further plate similar to plate 340 rigidly secured as by welding to the end of channel 306 and securing plate 340 thereto by bolt and nut assemblies.

In operation, an operator drives the harvester to an appropriate position near a standing tree and through manipulation of controls appropriately positions the processing assembly 300 near the base of a standing tree. The jaws of the processing assembly 302, the grapple 304 and the shear 305, when in an open position, receive the standing tree and thereafter the operator, through suitable hydraulic controls, closes the jaws of the processor 302 and grapple 304 to grasp the tree. The inclined arms of the shear positions the shear blades below the frame so the operator can readily visually observe correctly positioning the same as close to the ground as possible. The grasped tree is then severed from its roots by closing the jaws of the shear 305. Thereafter the operator controllably tilts the processing assembly 300 about pivot pin 208 to fell the standing tree. After the shear jaws have been opened the grip of arms 321, 320, 345 and 346 is partially relieved and motor 318 is activated to propel the tree endwise through the stripper delimber 302 and grapple 304. The jaws provided by the respective members press the stem of the tree against slide plates 375 and 376 on respective assemblies 307 and 308 retaining the tree in contact with the cleats 313 tractively engaging an outer peripheral portion of the tree. The limbs are removed from the tree as it is propelled in a direction toward the vehicle and the leading end of the processed tree may be severed by the shear 305 into selected lengths.

In the embodiment illustrated in FIG. 1, a striker plate 500 is mounted on the boom element 201 and is engaged by the leading end of the tree as it is propelled through the processing assembly 300. The operator visually observes movement of the striker plate 500 and thereafter de-activates the tree feed drive motor 318 stopping movement of the tree through the processing assembly. Thereafter the shear 305 is activated to sever the desired selected length from the leading end of the tree. The procedure is performed until the complete tree has been processed. By slewing the boom on the vehicle, the operator can drop the processed logs at different positions about the vehicle. If desired, the operator may appropriately position the boom to drop the severed logs directly into the carrier 102 mounted on the trailing chassis of the vehicle.

Figure 6:
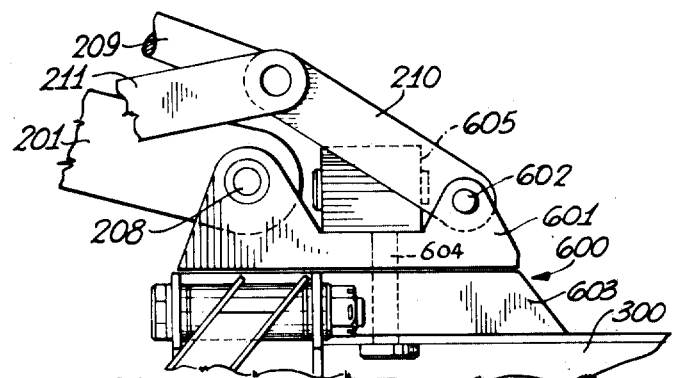
FIG. 6 is a side elevational view of a modified mounting for attaching the processing assembly to the free end of an extendible and retractable boom.
Figure 5:
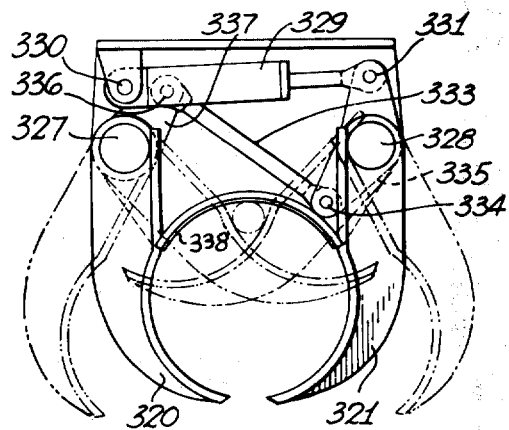
FIG. 5 is a partial top plan view of FIG. 2.
Figure 4:
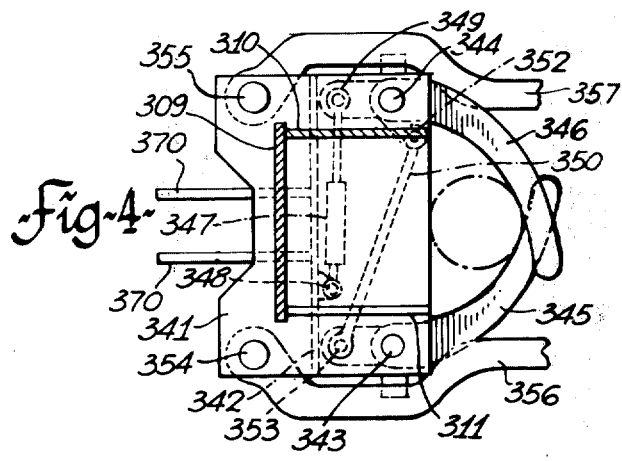
FIG. 4 is a section along line 4—4 of FIG. 3.

An alternative assembly for mounting the processing assembly 300 on the free end of the boom is illustrated in FIG. 6 and which permits pivoting the processing assembly about an axis perpendicular to the pivot axis of pin 208. Referring to FIG. 6, there is illustrated a mounting 600 consisting of a base 601 pivotally attached to the free end of boom member 201 by pivot pin 208. Link 210 is pivotally attached to the base 601 by pivot pin 602. The processing assembly 300 has a member 603 secured thereto and which is in face-to-face contact with a flat face on base member 601. The members 601 and 602 are pivotally interconnected by a pivot mounting pin 604 permitting the processing assembly 300 to pivotally move about an axis perpendicular to the pivot axis of pin 208. This allows rotating the processing assembly such that during processing of a tree the feed path is not in a direction toward the vehicle. By such an arrangement full tree lengths can be processed without fear of having the leading end of the tree strike the vehicle during processing. In order to pivot the processing assembly 300 about pin 604, a hydraulic motor 605 may be provided and which drives the pivot pin 604. In such instance, the motor 605 is rigidly secured to the base 601 and the shaft thereof is drivingly connected to pin 604 and which is secured to member 603. Alternatively, hydraulic cylinders or a rack and pinion type assembly may be used to pivot the processing assembly 300 about the pin 604. When the processing assembly 300 is rotated, for example, about pin 604 to a position such that the feed path is approximately 90° to the feed path illustrated in FIG. 1, means may be provided to allow changes in inclination of a tree during processing thereof.

One such means is illustrated in FIG. 7 wherein a rotary joint 800 is located in the boom element 201. The rotary joint may, if desired, be freely rotatable or, alternatively, driven as, for example, by a hydraulic motor 801. The rotary joint 800 permits rotating the free end portion of boom element 201 about an axis parallel to the length of the boom.

In FIG. 8 there is illustrated a modified harvester wherein a tree processing assembly 300 as described previously is mounted on the free end of a telescopic boom 850 carried by a mobile articulated vehicle 860. The mobile vehicle 860 has a bunk 861 mounted on a trailing chassis thereof for grasping trees and thereby permitting collecting and skidding the processed trees. The bunk 861 may be of the type, for example, disclosed in Canadian Pat. Nos. 840,775 issued May 5, 1970 and 824,003 issued Sept. 30, 1969.

In the modified harvester illustrated in FIG. 8, the telescopic boom 850 has a first section 851 mounted on the vehicle with respective second and third sections 852 and 853 telescopically arranged therein. The tree striker unit 500 illustrated in FIG. 1 may be secured to the boom element 853 providing fixed lengths of logs to be severed from the leading end of a tree during processing. Alternatively, the striker 500 may be mounted on boom element 852 and which would allow the operator to adjust the position of the processing assembly 300 relative to the striker plate 500 and thereby permit severing logs of different predetermined lengths during processing. In either arrangement, the striker plate 500 may be mounted such as to actuate a switch controlling hydraulic circuitry for the tree feed drive motor 318 and tree severing shear cylinder 368 to automatically sever desired lengths of the leading end of the tree during processing thereof.

I claim:
1. In a tree harvester:
   a. an elongated frame adapted to be moved to a position extending vertically along a trunk of a standing tree;

b. limb-shearing means mounted on the upper end of the frame;

c. driven endless conveying means mounted on the frame below the limb-shearing means and having formations thereon projecting therefrom for tractively engaging the trunk of the tree to propel the same endwise past the limb-shearing means;

d. a slide plate on said frame above and below said endless conveying means for slidably engaging the trunk of the tree as it is propelled endwise by said conveying means; and e. tree severing means mounted on the lower end of the frame below the endless conveying means and comprising a pair of arms pivotally mounted on the frame adjacent the lower end thereof and inclined downwardly and forwardly therefrom terminating in free outer end portions, a pair of cutting members secured to respective ones of said outer free end portions for severing the trunk of the tree embraced by said limb-shearing means, and hydraulic power cylinder means connected to said arms for moving the same to sever the trunk of the tree.

2. The device of claim 1 wherein said elongated frame has a central U-shape in cross-section portion and wherein said endless conveying means is mounted in said channel.

3. The device of claim 1 wherein said hydraulic power cylinder means interconnects and is located between said pair of arms.

4. The device of claim 3 wherein said hydraulic power cylinder means is located below the lower end of said elongated frame.

5. The device of claim 1 wherein said endless conveying means comprises an endless belt passing around two sprocket assemblies journalled on said elongated frame and motor means mounted on said frame and drivingly connected to one of said sprocket assemblies.

6. The device of claim 1 wherein said limb shear means comprises a cutting blade rigidly secured to said frame adjacent the upper end thereof and a pair of arms pivotally mounted on the frame and each having a curved cutting edge facing in a direction parallel to the length of the tree.

7. The device of claim 1 wherein said limb-shearing means comprises a combination grapple and stripper delimber including two curved arms pivotally mounted on the frame and each having a cutting edge and including a second grapple comprising a second pair of curved arms pivotally mounted on the lower end of said frame, said second pair of arms be so positioned as to embrace the trunk of the tree above said shear blades.

8. The device of claim 1 wherein said cutting members are flat planar plates having cutting edges facing one another.

9. A combination tree felling head and processing assembly comprising:

a. a rigid longitudinally extending frame with a central, substantially U-shaped in cross-section, portion providing a pair of parallel plate members spaced apart from one another for receiving an endless belt type driven tree feed means;

b. a first grapple comprising a first pair of curved arms pivotally attached to said frame at one end thereof and protruding therefrom to receive and grasp the stem of a tree extending parallel to said frame, said arms each having a cutting edge for severing limbs from the stem of a tree loosely embraced by such arms as the tree is propelled endwise;

c. a second grapple and tree severing device mounted on the end of the frame opposite to that of said first grapple, said second grapple comprising a second pair of curved arms pivotally attached to said frame and protruding therefrom to receive and grasp the stem of a tree grasped by said first grapple at a position spaced therefrom, said tree severing device comprising a third pair of arms pivotally mounted on said frame at a position adjacent the pivotal mounting of the arms of said second grapple, the pivots for said third pair of arms being spaced behind the pivots for said second grapple arms at a distance from the tree grasped by the grapple greater than that of the pivots for the arms of the second grapple, all of said pivot axes being parallel to one another and the third pair of arms extending in a direction inclined to the pivot axis in a direction away from the frame and terminating in free outer end portions, a pair of cutting members secured to respective ones of said third pair of arms adjacent the free terminal end portions thereof and disposed in a plane transverse to the length of the stem of a tree grasped by said first and second grapples, said cutting members being disposed in such a position as to sever the stem of a tree grasped by said grapples at a position spaced therefrom longitudinally along the tree, power means for the respective pairs of arms of each of said first and second grapple and tree severing device for pivotally moving the same, said power means for the severing device comprising a hydraulic cylinder interconnecting the arms and disposed at a position below the frame and second grapple;

d. tree feed means mounted in said U-shaped portion of said frame at a position between said first and second grapples and comprising an endless conveyor extending longitudinally along the frame between said pair of plate members, said endless conveyor having formations thereon for tractively engaging the surface of the stem of a tree loosely grasped by said first and second grapples; and e. a slide plate on said frame above and below said endless conveying means for slidably engaging the trunk of the tree as it is propelled endwise by said conveying means.

* * * * *